United States Patent [19]

Katsuta et al.

[11] 3,995,352

[45] Dec. 7, 1976

[54] GEAR SHAVING CUTTER

[75] Inventors: Michitaka Katsuta; Kiyoaki Morimoto, both of Akashi, Japan

[73] Assignee: Kobe Steel Ltd., Kobe, Japan

[22] Filed: Oct. 28, 1975

[21] Appl. No.: 626,462

[30] Foreign Application Priority Data

Oct. 28, 1974 Japan .......................... 49-124574

[52] U.S. Cl. ............................................ 29/103 R
[51] Int. Cl.² ............................................ B26D 1/12
[58] Field of Search ............ 29/95 R, 103 R, 103 B, 29/105 R, 105 A; 90/1.65

[56] References Cited

UNITED STATES PATENTS

| 2,295,148 | 9/1942 | Witham | 29/103 R |
| 3,365,773 | 1/1968 | Olsen | 29/105 R |

FOREIGN PATENTS OR APPLICATIONS

| 2,005,303 | 8/1971 | Germany | 29/103 R |
| 27,153 | 9/1907 | Sweden | 29/103 R |
| 260,365 | 6/1970 | U.S.S.R. | 29/103 R |
| 1,180,207 | 2/1970 | United Kingdom | 29/103 B |

Primary Examiner—Harrison L. Hinson
Attorney, Agent, or Firm—Oblon, Fisher, Spivak, McClelland & Maier

[57] ABSTRACT

A gear shaving cutter, which is rotated in meshing engagement with a gear to be finished so as to impart a shaving finish to the latter, is formed upon its periphery with a plurality of cutting teeth, each of which is formed wholly or partially upon its cutting faces with two groups of grooves disposed to extend in two directions different from each other so as to thereby define therebetween lands having a generally rhombus or rhomboid configuration.

4 Claims, 4 Drawing Figures

GEAR SHAVING CUTTER

BACKGROUND OF THE INVENTION

1. Field of the Invention

The present invention relates generally to a finishing tool for gears, and more particularly to a gear shaving cutter, which is rotated in meshing engagement with a gear material to be finished, so as to impart a shaving finish to the gear material.

2. Description of the Prior Art

In the case where a gear material to be finished is to be subjected to shaving or to cold or hot finish rolling, the gear material and a gear finishing tool, which may be, for example, a shaving cutter, are brought into firm meshing engagement with each other with an intersecting angle defining between both axes thereof for performance of the shaving operation, a zero degree angle being so defined for the performance of a cold rolling operation, such that one of the elements is forcibly driven while the other one thereof follows the rotation of the former, thus establishing the desired finishing operation.

In the case where shaving is to be accomplished by means of the use of a conventional shaving cutter, especially wherein a gear is to be shaved with a small intersecting angle defined between the axes of the shaving cutter and the gear to be shaved, as in the case of a shoulder gear, an excessively large contact area exists between the shaving cutter and the gear, or more specifically, between the land portions, which are formed upon the cutting faces of the teeth of the shaving cutter, and the faces of the gear. As a result, the contact pressure developed at the contacting faces of the elements is so reduced that even when a predetermined infeed face is imparted to the shaving cutter, the cutting edges of the land portions do not cut sufficiently into the face surface of the gear, the amount of shaving capable of being performed within one operation being substantially reduced, while at the same time, the time period required for accomplishing a predetermined amount of shaving is correspondingly lengthened. Therefore, the productivity of the shaving process is accordingly reduced.

If, on the other hand, the working pressure to be applied to the shaving cutter is so increased as to obtain the desired amount of cutting, elastic deformation is caused within the mandrel supporting the gear or within the gear itself, and as a result, the precision of the finishing operation of the face of the gear is greatly deteriorated.

In the case of cold rolling working, a finishing tool has been proposed which has the same shape as that of the shaving cutter and which has cutting teeth each of which is formed upon its entire face with grooves which are arranged equidistantly from the addendum to the deddendum so as to thereby define land portions therebetween. In this case, however, where the rolling working is accomplished by use of such a finishing tool with the contact pressure being non-uniform at the contacting faces of the finishing tool and the gear, wave marks are resultantly formed upon the flank of the finished gear, thus causing a considerable reduction in the precision working of the gear elements.

SUMMARY OF THE INVENTION

Accordingly, it is an object of the present invention to eliminate the aforenoted drawbacks characteristic of the prior art apparatus.

Another object of the present invention is to provide a gear shaving cutter which has such a reduced contact area with the gear to be finished that it can effectively accomplish the desired finish working process under high contact pressure conditions with the gear.

Still another object of the present invention is to provide a gear shaving cutter which has its contact region with the gear maintained under uniform contact pressure so as to fabricate a gear having a high degree of precision with respect to its teeth configuration.

The foregoing and other objects are accomplished in accordance with the present invention by means of a shaving cutter which has cutting teeth, each of which is formed upon the entire or partial regions of its cutting faces, with two groups of grooves disposed to extend in two different directions with respect to each other.

In accordance with an embodiment of the present invention, the two groups of grooves are disposed equidistantly over the entire region of the cutting faces of each of the cutting teeth so as to extend in two directions so as to intersect each other and thereby to define therebetween lands substantially of a rhombus configuration.

According to a further embodiment of the present invention, there is provided a shaving cutter, within which one group of the grooves is disposed equidistantly over the entire or partial region of the cutting faces of each of the cutting teeth, so as to extend in the radial direction of the shaving cutter and in parallel with respect to each other, and in which further, the other group of grooves are disposed equidistantly over the entire or partial region thereof in parallel with respect to each other and in such a direction as to intersect the grooves of the first group so as to thereby define therebetween lands substantially of a rhomboid configuration.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE ILLUSTRATED EMBODIMENTS

Figure 1:
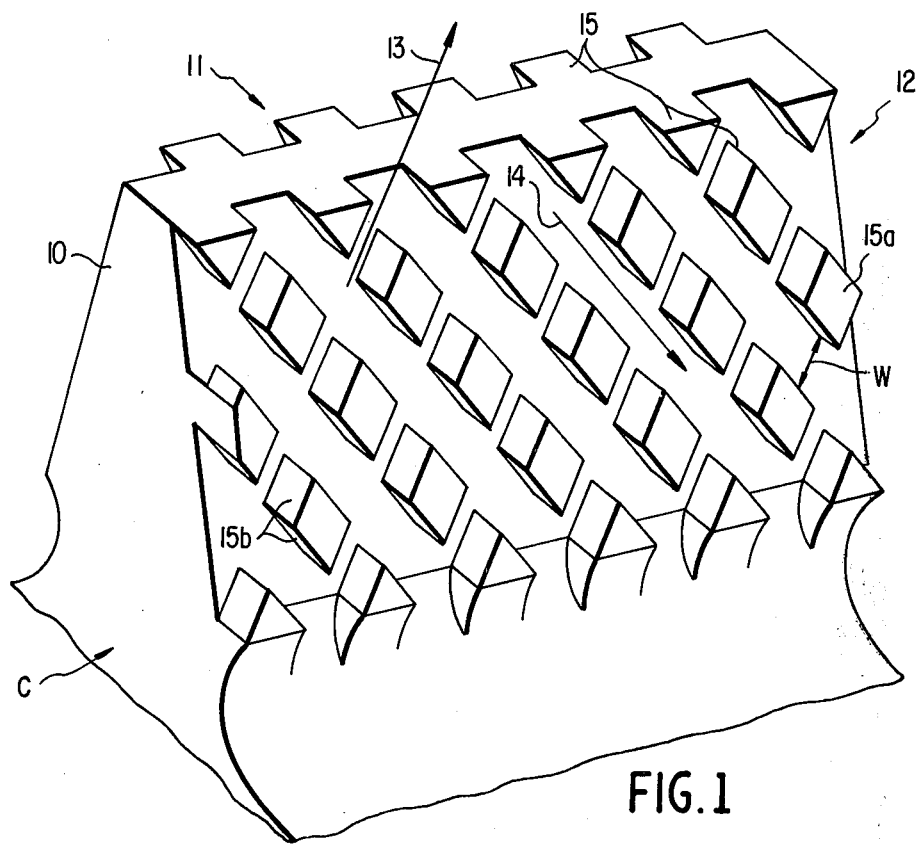
FIG. 1 is a perspective view showing a gear shaving cutter tooth constructed in accordance with the present invention.

Referring now to the drawings, and more particularly to FIG. 1 thereof, there is shown, in an enlarged manner, a tooth 10 of a shaving cutter C which is fabricated in accordance with the present invention, the tooth being formed upon the outer periphery of the shaving cutter C. Side surfaces 11 and 12 of the tooth 10 are each formed with two groups of grooves 13 and 14 thereon, the grooves 13 of the first group being disposed parallel and equidistantly with respect to each other, and aligned in a first direction so as to extend from the deddendum to the addendum, while the grooves 14 of the second group are disposed parallel and equidistantly with respect to each other, and aligned in a direction so as to intersect the grooves 13, thus defining therebetween lands 15, the cross-section of which substantially forms a rhombus. The width, depth, direction and position of the two groups of grooves 13 and 14, which are formed upon both side surfaces 11 and 12 of the tooth 10, are predetermined so as to have suitable values in accordance with a manner in which the shaving cutter C is to be employed as a finishing tool.

The discussion will now proceed in connection with the case where the shaving operation of a gear to be finished is performed by using the shaving cutter having the construction thus far described. In operation, the shaving cutter is firmly meshed with the gear to be shaved, with a predetermined intersecting angle established between both axes thereof, and the same are forcibly rotated together. When the shaving cutter and the gear are so meshed with each other, the tooth surfaces of the gear are in contact with the tooth surfaces of the shaving cutter, and more specifically, in contact with faces 15a of the lands 15 of the latter within a contact region defined between the shaving cutter and the gear.

Since, in this instance, the lands 15 are defined so as to have a substantially rhombus shape in cross-section by means of the two intersecting groups of grooves 13 and 14 which are disposed equidistantly in the two directions as noted hereinabove, the area of contact defined between the shaving cutter and the gear is considerably reduced as compared with the case of employing a shaving cutter especially of the type within which the grooves are formed so as to be spaced equidistantly apart with respect to each other and in a parallel relationship with each other as defined by radially extending lands of the cutter which extend from the deddendum to the addendum. Thus, the contact pressure per unit area developed during the shaving operation is so increased as to materially improve the cutting performance depth of the shaving cutter into the surface of the gear.

If, under this condition, the shaving cutter and the gear are rotated, cutting edges 15b of the lands 15 are allowed to slide in the disposed direction, which is determined by means of the sliding characteristics in the direction of the tooth contour and by the sliding characteristics in the direction of the gear space, while performing the shaving operation upon and with respect to the surface of the gear. Thus, the shaving depth afforded and determined by means of the lands 15 is increased in comparison with the above-described conventional shaving cutter, and as a result, the frictional resistance characteristic of the cutting edges 15b is considerably reduced, the wear of the cutting edges 15b due to such friction is accordingly reduced, and thus, the service life time of the shaving cutter is correspondingly increased.

Within a rolling operation utilizing the shaving cutter of the present invention, the finishing process is, contrary to the foregoing operation, accomplished by means of the fact that the contact faces 15a of the lands 15 apply pressure to the tooth surfaces of the gear, however as is similar to the case of the shaving process, the contact area within the contact region between the shaving tool and the gear is reduced, which in turn increases the contact pressure per unit area. Moreover, since the lands 15 are defined by means of the bi-directional grooves 13 and 14, the contact pressure can be uniformly applied and distributed within the contact region, thus making it possible to improve the precision of the tooth shape or configuration obtained.

Figure 2:
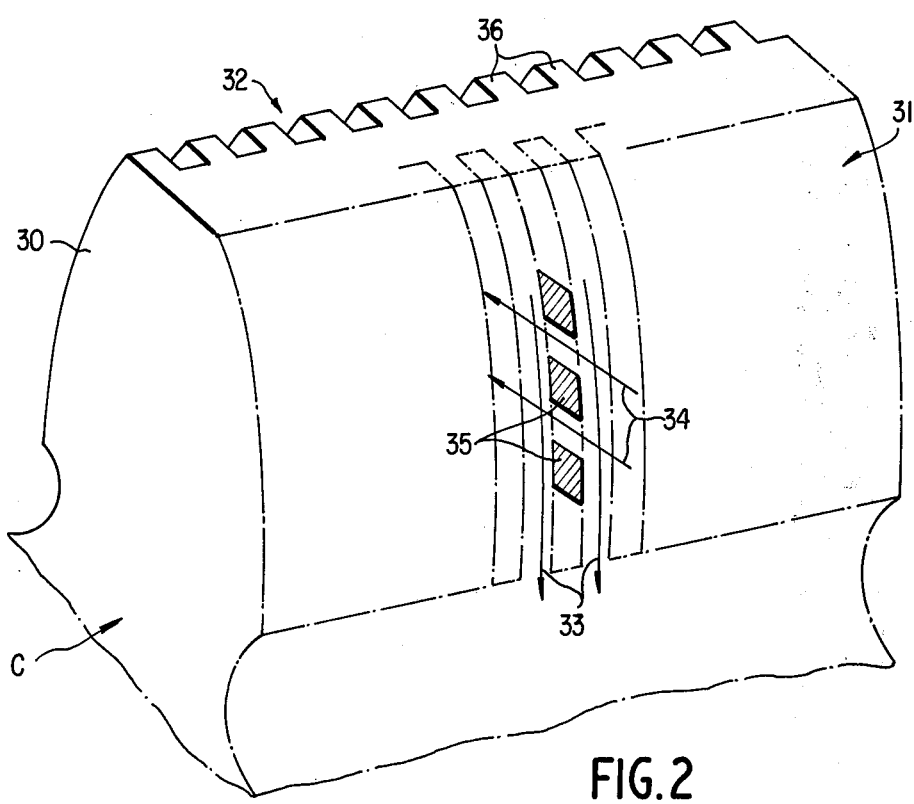
FIG. 2 is a perspective view, partly in cross-section, showing another embodiment of the present invention.

A second embodiment of the present invention will now be described with particular reference being made to FIG. 2, with which a tooth formed upon the circumference of the shaving cutter is slightly modified. More particularly, the tooth 30 has one tooth surface 31 formed thereon with grooves 33 and 34, which are disposed in two directions intersecting each other, as in the case of the first embodiment, so as to thereby define therebetween lands 35 substantially rhomboidal in configuration. The other tooth surface 32 of the tooth 30 is, to the contrary, formed thereon with grooves, not numbered, which are disposed equidistantly in the axial direction of the cutter, as in the case of the conventional construction, so as to define lands 36 over the entire region thereof.

With this structural arrangement, therefore, the uniformity of the contact pressure per unit area within the contact region between the tooth faces of the drive and driven elements can be improved during the finishing process of the gear, thus making it possible to improve the desired operational precision. It should be noted here that the construction, as disclosed within U.S. Pat. No. 3,875,630, can be adopted with respect to the lands 36 formed upon the tooth surface 32.

Figure 3:
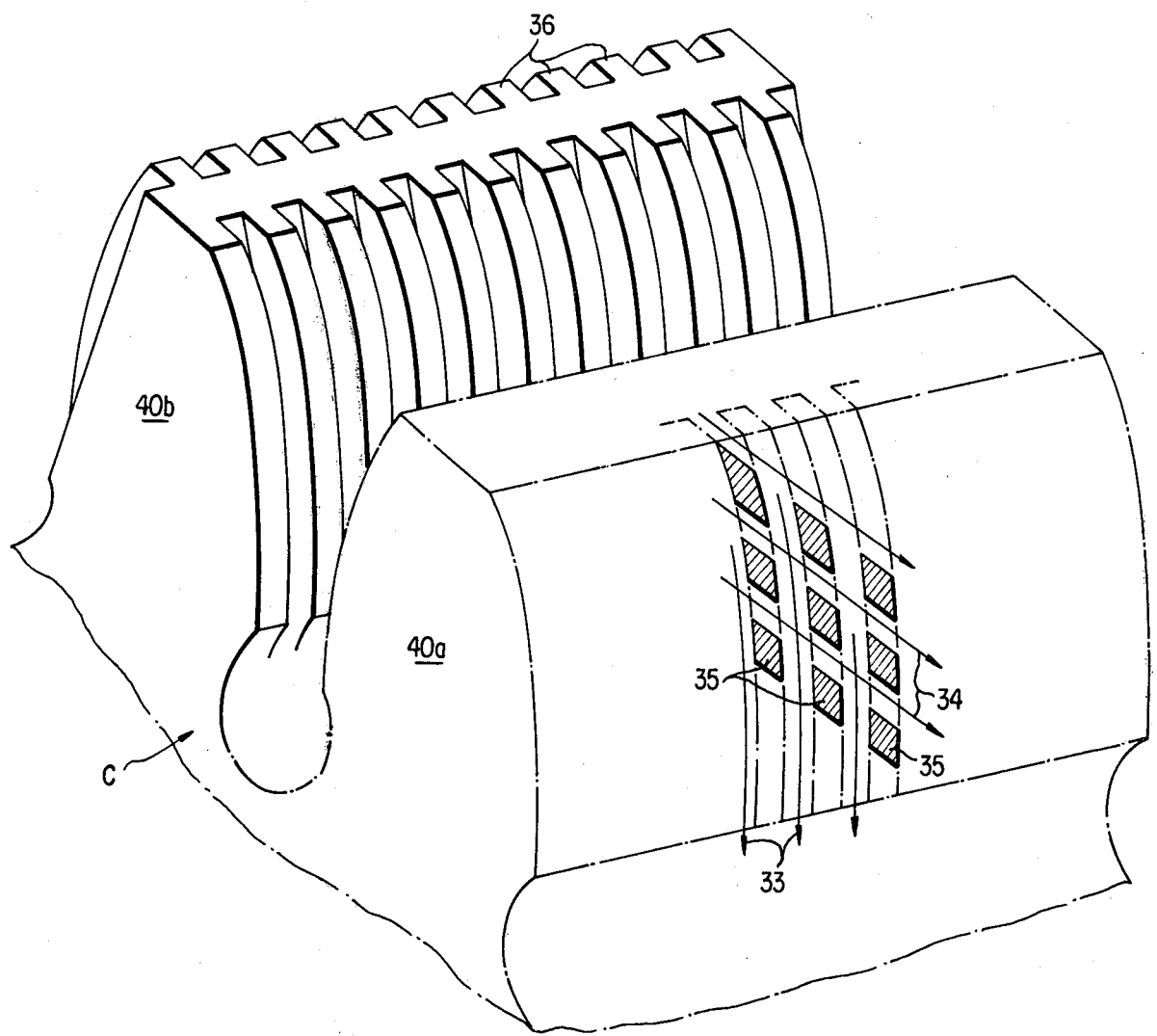
FIG. 3 is a view similar to that of FIG. 2, showing however, gear teeth of a further embodiment of the present invention.
Figure 4:
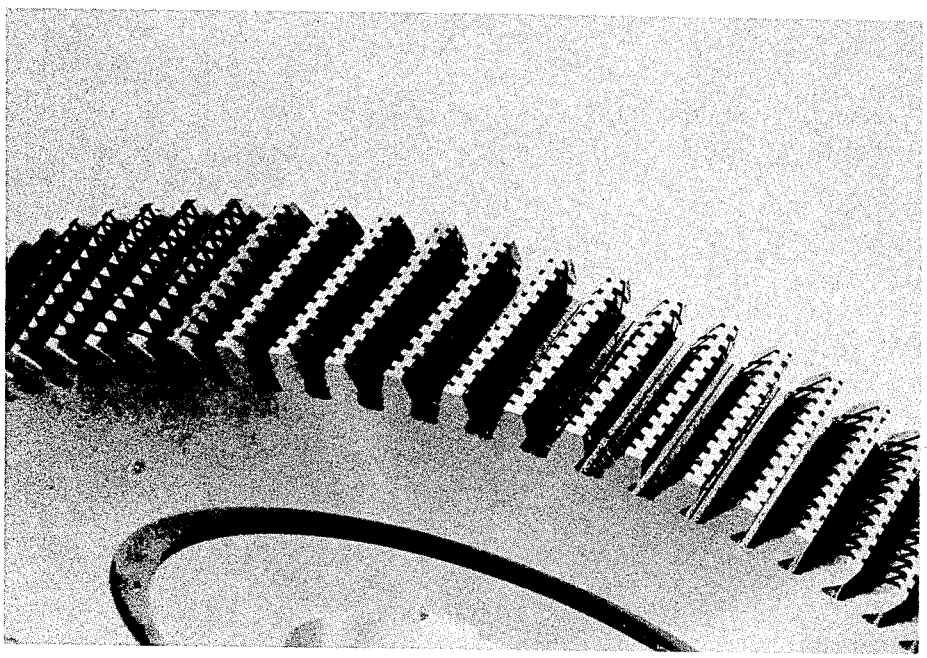
FIG. 4 is a photographic presentation of a shaving cutter constructed in accordance with the present invention.

Within a third embodiment of the present invention as shown in FIG. 3, teeth 40 formed upon the circumference of the shaving cutter C comprise teeth 40a, which have, upon both surfaces thereof, lands constructed in accordance with the present invention, and teeth 40b which have, upon both surfaces thereof, the conventional lands, the two types of teeth 40a and 40b being disposed alternately or in some other suitable symmetrical or periodic order. Within FIG. 4, there is shown a photograph which discloses a representative embodiment of a gear shaving cutter constructed in accordance with the present invention.

As has been described hereinbefore, in accordance with the present invention, the tooth surfaces of the shaving cutter are formed with two groups of grooves which are disposed in different, intersecting directions so as to define lands therebetween. With these structural arrangements, it should be appreciated that substantial advantages are afforded by means of the present invention in that it is possible to uniformalize the contact region between the shaving cutter and the gear to be finished, that the precision in the teeth configurations of the shaved gear is remarkably improved, and that the service life time of the shaving tool can be considerably increased. Moreover, as it has been confirmed that the shaving cutter is less influenced by vibrations encountered during the shaving operation, and is excellent for performing and conducting precision cutting operations, it is quite suitable for use within finish working of a gear, especially, ones of great hardness.

Obviously, many modifications and variations of the present invention are possible in light of the above teachings. It is to be understood therefore that within the scope of the appended claims, the invention may be practiced otherwise than as specifically described herein.

What is claimed as new and desired to be secured by letters patent of the United States is:

1. A gear shaving cutter comprising a rotatably body which is adapted to be rotated in meshing engagement with a gear to be finished so as to apply a shaving finish to said gear and which has a plurality of teeth disposed about the periphery thereof, each tooth of which includes two side cutting faces, the improvement comprising:

a first plurality of said cutting teeth of said cutter have formed upon a region of said cutting faces two groups of grooves disposed so as to extend in two directions which are different from each other, said two groups of grooves having the same depth so as to define individual cutting land members therebetween.

2. A gear shaving cutter according to claim 1, wherein:

said two groups of said grooves are disposed equidistantly over the entire region of the cutting faces of each of said cutting teeth, the two directions intersecting each other so as to thereby define therebetween said lands having a substantially rhombus configuration.

3. A gear shaving cutter according to claim 1, wherein:

one group of said grooves is disposed equidistantly over a region of the cutting faces of each of said cutting teeth in the radial direction of the shaving cutter and in parallel with respect to each other, and the other group of said grooves is disposed equidistantly over a region parallel with respect to each other and in such a direction as to intersect the grooves of said one group so as to thereby define therebetween said lands having a substantially rhomboid configuration.

4. A gear shaving cutter according to claim 1, wherein:

a second plurality of the cutting teeth of said cutter are formed with grooves arranged equidistantly in the radial direction of the shaving cutter and in parallel with respect to each other, said second plurality of teeth being disposed upon said cutter in an alternative fashion with respect to said first plurality of teeth disposed upon said cutter.

* * * * *